(No Model.)

W. H. POWERS.
VENEER CUTTING MACHINE.

No. 531,218. Patented Dec. 18, 1894.

WITNESSES:
Lois Moulton.
Lennie E. Flanders

INVENTOR
*William H. Powers*
BY
*Luther V. Moulton*
ATTORNEY.

THE NORRIS PETERS CO., PHOTO-LITHO., WASHINGTON, D. C.

UNITED STATES PATENT OFFICE.

WILLIAM H. POWERS, OF GRAND RAPIDS, MICHIGAN.

VENEER-CUTTING MACHINE.

SPECIFICATION forming part of Letters Patent No. 531,218, dated December 18, 1894.

Application filed July 10, 1893. Serial No. 479,998. (No model.)

*To all whom it may concern:*

Be it known that I, WILLIAM H. POWERS, a citizen of the United States, residing at Grand Rapids, in the county of Kent and State of Michigan, have invented certain new and useful Improvements in Veneer-Cutting Machines; and I do hereby declare the following to be a full, clear, and exact description of the invention, such as will enable others skilled in the art to which it appertains to make and use the same.

My invention relates to improvements in veneer cutting machines, and more particularly to the mechanism in such machines for longitudinally moving the log-carrying shaft, and its object is to provide an improved mechanism for such purpose.

Figure 1:
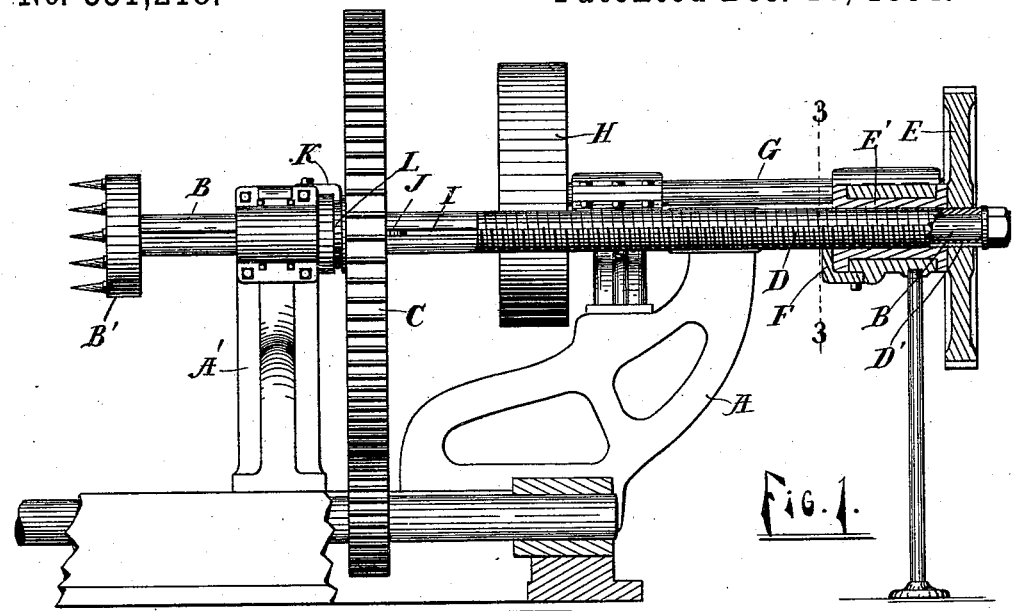
Figure 2:
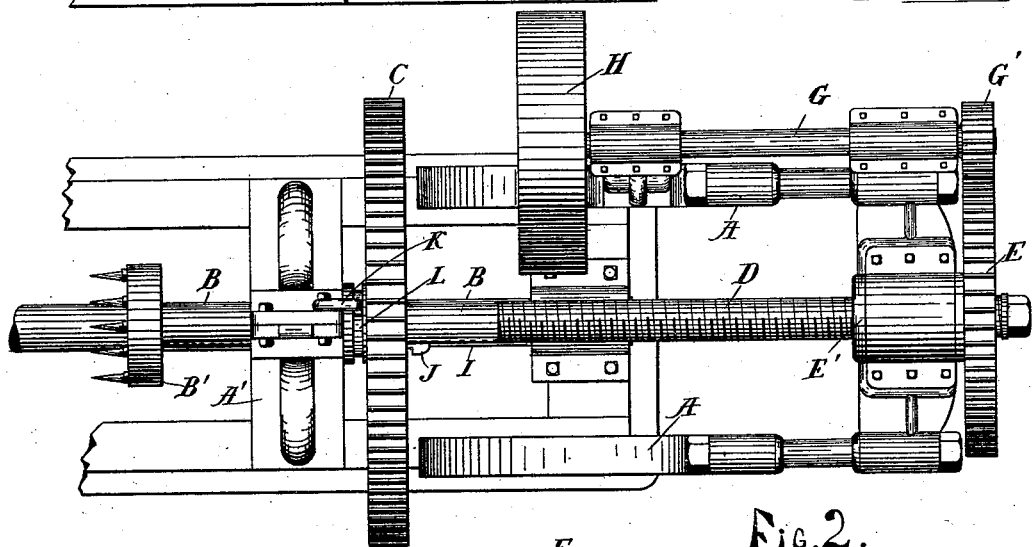
Figure 3:
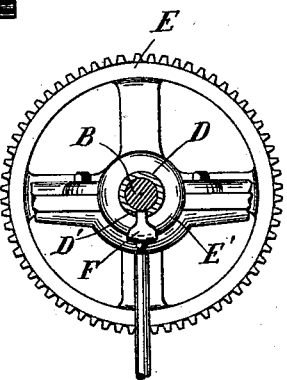

In the accompanying drawings, Figure 1 is a side elevation of a device embodying my invention with portions broken away to show the construction. Fig. 2 is a plan view of the same, and Fig. 3 a detail in section on the line 3—3 of Fig. 1.

Like letters refer to like parts in all of the figures.

To the main frame are attached suitable brackets A, provided with suitable bearings for the shafts and other moving parts hereinafter described.

B is the log carrying shaft, provided with a spur head B', to engage and rotate the log. Said shaft is journaled in a suitable bearing on the head A' in which bearing it is longitudinally movable and is driven by a gear C, held against longitudinal movement with the shaft by a hook K, engaging a groove L in the hub of said gear.

I is a groove or key-way in the shaft B, and J is a key fixed in the hub of the gear C, and traversing said groove, by which rotary motion is imparted to said shaft.

The shaft B is also prolonged at the end opposite the head B' and reduced in diameter and provided with a screw threaded sleeve D, in which sleeve said shaft rotates freely. Said sleeve is prevented from rotating and allowed to move longitudinally by means of a fixed lug F, which engages a longitudinal groove, or key-way D' in said sleeve.

E' is a nut having a thread engaging the thread of the sleeve D; journaled in suitable bearings, and provided with a gear wheel E for rotating said nut; which gear wheel is operated by a pinion G' on a countershaft G, provided with a pulley H, which pulley may be operated by any suitable reversible mechanism, preferably a belt leading to a countershaft, provided with the usual reverse motion, such as is used for lathes.

The operation of my device is obvious. When the pulley H is put in motion in either direction the nut E' is rotated and forces the sleeve D, and shaft B to move longitudinally either toward or from the log, according to the direction in which said pulley is turned. I am thus enabled to force the spurs in the head B' into the log, or withdraw them therefrom with great force, and by means entirely independent of the mechanism for rotating the log.

What I claim is—

1. In a veneer cutting machine, the combination with the rotative shaft carrying log engaging devices at one end and reduced in diameter at its other end, a non-rotative sleeve encircling the reduced part of said shaft and threaded externally, and a rotative nut on said sleeve for moving the same and the shaft longitudinally, substantially as described.

2. In a veneer cutting machine, the combination with an externally threaded sleeve having a longitudinal key-way, a longitudinally-movable shaft rotating freely through said sleeve and having log engaging devices at one end, a rotative nut threaded upon said sleeve, a fixed lug engaging said key-way and preventing rotation of the sleeve, a gear fixed upon said nut, and driving mechanism engaging said gear, substantially as described.

3. In a veneer cutting machine, the combination with a shaft having mechanism for moving it longitudinally and provided with log carrying devices and formed with a longitudinal key-way, of a gear wheel through which the shaft moves longitudinally, said gear wheel having a key engaging said key-way in the shaft and also having a grooved hub, a fixed journal bearing for the shaft having a hook engaging said grooved hub and preventing longitudinal movement of the gear wheel, and means for operating said gear wheel to rotate the shaft, substantially as described.

In testimony whereof I affix my signature in presence of two witnesses.

WILLIAM H. POWERS.

Witnesses:
 LUTHER V. MOULTON,
 LOIS MOULTON.